US008310616B2

(12) United States Patent
Yun et al.

(10) Patent No.: US 8,310,616 B2
(45) Date of Patent: Nov. 13, 2012

(54) LIQUID CRYSTAL DISPLAY DEVICE

(75) Inventors: Su-Young Yun, Asan-si (KR);
Young-Ho Lee, Suwon-si (KR);
Jae-Hwan Chun, Suwon-si (KR)

(73) Assignee: Samsung Display Co., Ltd. (KR)

( * ) Notice: Subject to any disclaimer, the term of this patent is extended or adjusted under 35 U.S.C. 154(b) by 721 days.

(21) Appl. No.: 12/500,408

(22) Filed: Jul. 9, 2009

(65) Prior Publication Data

US 2010/0171897 A1 Jul. 8, 2010

(30) Foreign Application Priority Data

Jan. 6, 2009 (KR) .................. 10-2009-0000778

(51) Int. Cl.
*G02F 1/1333* (2006.01)
(52) U.S. Cl. ............. 349/58; 349/65; 349/67; 362/632; 362/97.2
(58) Field of Classification Search ............ 349/58, 349/65, 64, 62, 67, 69, 70; 362/97.1, 97.2, 362/632–634, 611–614
See application file for complete search history.

(56) References Cited

U.S. PATENT DOCUMENTS

| 7,564,516 B2 * | 7/2009 | Azuma et al. ............ 349/61 |
| 7,722,242 B2 * | 5/2010 | Chen et al. ............ 362/634 |
| 2006/0291254 A1 * | 12/2006 | Jeong et al. ............ 362/632 |
| 2008/0079865 A1 * | 4/2008 | Kang et al. ............ 349/61 |
| 2009/0167979 A1 * | 7/2009 | Watanabe ............ 349/58 |

FOREIGN PATENT DOCUMENTS

| JP | 3130253 | 2/2007 |
| KR | 2006-0019654 | 3/2006 |
| KR | 2007-0118874 | 12/2007 |
| KR | 2008-0034684 | 4/2008 |

* cited by examiner

*Primary Examiner* — Thoi Duong
(74) *Attorney, Agent, or Firm* — Innovation Counsel LLP

(57) ABSTRACT

Provided is a liquid crystal display device which is capable of preventing light leakage and preventing a dark portion from being viewed. The liquid crystal display device includes: a lower receiving container; a plurality of supporting walls arranged in a line along at least one side wall of the lower receiving container with gaps therebetween; a plurality of light sources arranged in a line so as to be provided in the gaps; and a reflecting cover covering at least a portion of each of the gaps.

20 Claims, 10 Drawing Sheets

US 8,310,616 B2

LIQUID CRYSTAL DISPLAY DEVICE

This application claims priority from Korean Patent Application No. 10-2009-0000778 filed on Jan. 6, 2009 in the Korean Intellectual Property Office, the disclosure of which is incorporated herein by reference in its entirety.

BACKGROUND OF THE INVENTION

1. Field of the Invention

The present invention relates to a liquid crystal display device, and more particularly, to a liquid crystal display device capable of preventing light leakage and preventing a dark portion from being viewed.

2. Description of the Related Art

A liquid crystal display is one of the most commonly used flat panel displays and includes two substrates having electrodes formed thereon and a liquid crystal layer interposed therebetween. When a voltage is applied between the electrodes, liquid crystal molecules in the liquid crystal layer are rearranged to adjust the quantity of transmitted light.

The liquid crystal display device is a passive light-emitting device and requires a separate light source that supplies light to a liquid crystal panel. The light source is accommodated in a lower receiving container. The light source uses a plurality of reflective members or adopts a structure capable of obtaining uniform brightness in order to reduce light loss and improve light efficiency.

As an example of the plurality of reflective members, a reflecting sheet is provided in the lower receiving container made of a metal material. In addition, for example, in a structure capable of improving light efficiency, any of the following structures can be used: a structure in which the side wall of a lower receiving container is formed at an obtuse angle with respect to the bottom of the lower receiving container such that light emitted from a light source effectively travels toward a liquid crystal panel; and a structure in which a reflecting sheet is inclined.

In order to reduce the number of reflective members and simplify a manufacturing process, a structure has been proposed in which a lower receiving container is formed of a reflective resin and supporting walls are formed between light sources.

SUMMARY OF THE INVENTION

Aspects of the present invention provide a liquid crystal display device capable of preventing light leakage and preventing a dark portion from being viewed.

However, aspects of the present invention are not restricted to the embodiments set forth herein. The above and other aspects of the present invention will become more readily apparent to one of ordinary skill in the art to which the present invention pertains by referencing the detailed description of the present invention given below.

According to an aspect of the present invention, there is provided a liquid crystal display device including: a lower receiving container; a plurality of supporting walls arranged in a line along at least one side wall of the lower receiving container with gaps therebetween; a plurality of light sources arranged in a line so as to be provided in the gaps; and a reflecting cover covering at least a portion of each of the gaps.

According to another aspect of the present invention there is provided a liquid crystal display device including: a lower receiving container; a plurality of supporting walls arranged in a line along at least one side wall of the lower receiving container with gaps therebetween; a plurality of light sources arranged in a line so as to be provided in the gaps; a reflecting cover covering at least a portion of each of the gaps; and an intermediate receiving container provided above the lower receiving container and made of a reflective resin, wherein each of the supporting walls includes: a supporting wall upper surface; and a supporting wall inclined plane that extends from the supporting wall upper surface to the bottom of the lower receiving container and has a first length.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EXEMPLARY EMBODIMENTS

Figure 1:
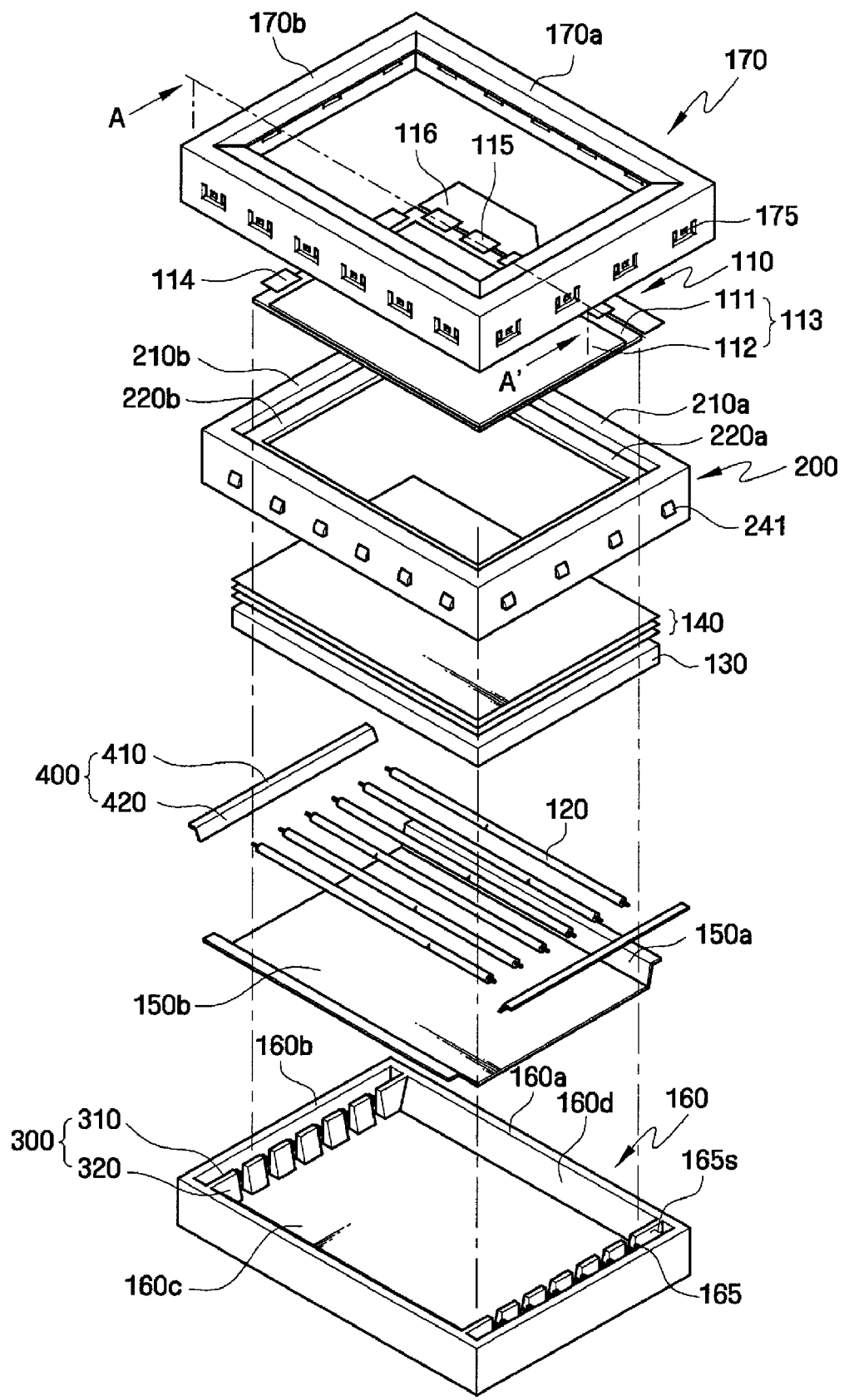
FIG. 1 is an exploded perspective view illustrating a liquid crystal display device according to a first embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processes, well-known structures and well-known technologies will not be specifically described in order to avoid ambiguous interpretation of the present invention. Like reference numerals refer to like elements throughout the specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

Spatially relative terms, such as "below," "beneath," "lower," "above," "upper," and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or components would then be oriented "above" the other elements or components. Thus, the exemplary term "below" or "beneath" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Embodiments of the invention are described herein with reference to plan and cross-section illustrations that are schematic illustrations of idealized embodiments and intermediate structures of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Figure 2:
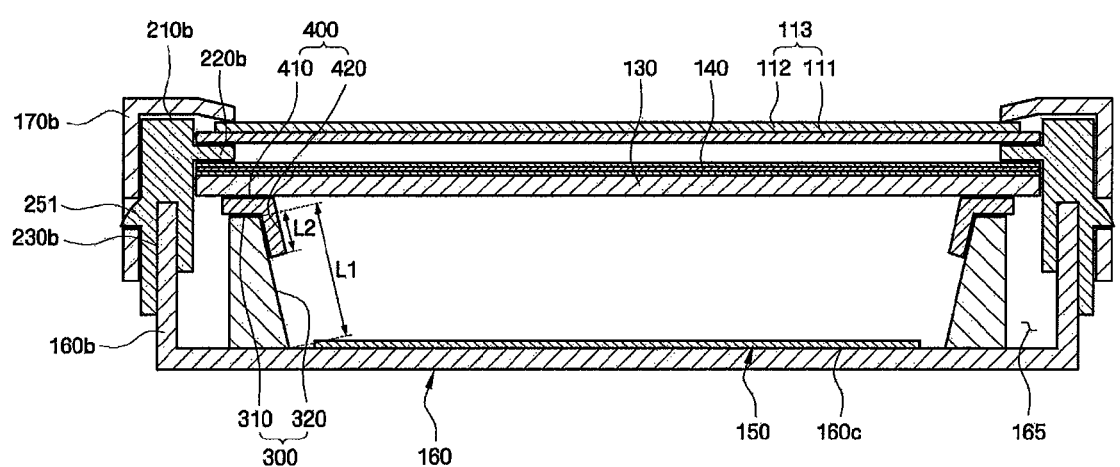
FIG. 2 is a cross-sectional view illustrating the liquid crystal display device taken along the line A-A' of FIG. 1.
Figure 3:
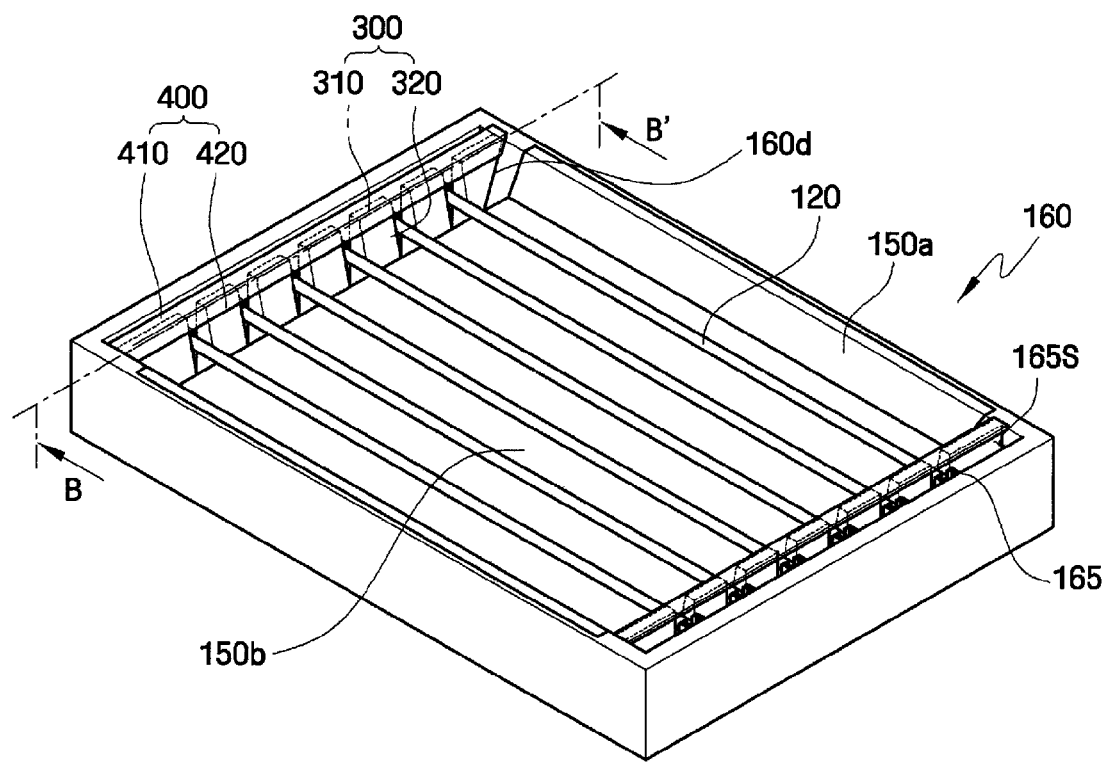
FIG. 3 is a perspective view illustrating a lower receiving container of the liquid crystal display device according to the first embodiment of the present invention.
Figure 4:
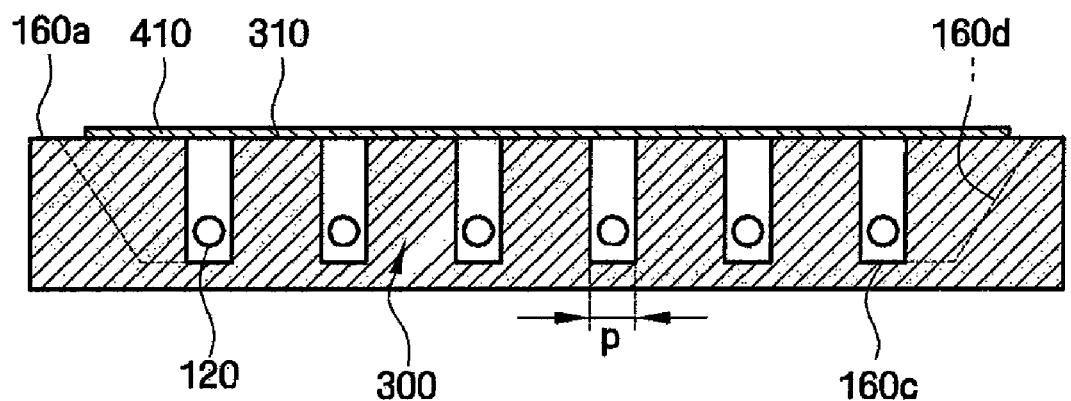
FIG. 4 is a cross-sectional view illustrating the liquid crystal display device taken along the line B-B' of FIG. 3.

Hereinafter, a liquid crystal display device according to a first embodiment of the present invention will be described in detail with reference to FIGS. 1 to 4. FIG. 1 is an exploded perspective view illustrating the liquid crystal display device according to the first embodiment of the present invention. FIG. 2 is a cross-sectional view illustrating the liquid crystal display device taken along the line A-A' of FIG. 1. FIG. 3 is a perspective view illustrating a lower receiving container of the liquid crystal display device according to the first embodiment of the present invention. FIG. 4 is a cross-sectional view illustrating the liquid crystal display device taken along the line B-B' of FIG. 3.

Referring to FIGS. 1 and 2, the liquid crystal display device according to the first embodiment of the present invention includes a lower receiving container 160 including a liquid crystal panel assembly 110, light sources 120, a diffusion plate 130, an optical sheet 140, a reflecting sheet 150, and supporting walls 300 formed therein, an upper receiving container 170, an intermediate receiving container 200, and a reflecting cover 400.

The liquid crystal panel assembly 110 includes a liquid crystal panel 113 including a thin film transistor substrate 111 and a common electrode substrate 112, liquid crystal (not shown), a gate tape carrier package 114, a data tape carrier package 115, and a printed circuit board 116.

The liquid crystal panel 113 includes the thin film transistor substrate 111 including, for example, gate lines (not shown), data lines (not shown), a thin film transistor array, and pixel electrodes, and the common electrode substrate 112 that includes, for example, a black matrix and a common electrode arranged to face the thin film transistor substrate 111. For example, the black matrix and color filters may be formed on the thin film transistor substrate 111.

The plate-shaped substrates are laminated to each other to form the liquid crystal panel 113, and the liquid crystal panel 113 is mounted to the intermediate receiving container 200. Specifically, the liquid crystal panel 113 is mounted to mounting protrusions 220a and 220b that protrude from the inner surfaces of intermediate receiving container side walls 210a and 210b of the intermediate receiving container 200.

The gate tape carrier package 114 is connected to the gate lines (not shown) formed on the thin film transistor substrate 111, and the data tape carrier package 115 is connected to the data lines (not shown) formed on the thin film transistor substrate 111.

Various driving parts that can respectively input gate driving signals and data driving signals to the gate tape carrier package 114 and the data tape carrier package 115 are mounted on the printed circuit board 116. The printed circuit board 116 may be provided between one intermediate receiving container side wall 200a and an upper receiving container side wall 170a.

An LED (light emitting diode), a CCFL (cold cathode fluorescent lamp), or an EEFL (external electrode fluorescent lamp) may be used as the light source 120. In this embodiment, the CCFL may be used as an example of the light source 120. The light sources extend in the horizontal direction of the liquid crystal display device. In this embodiment, the horizontal direction is parallel to the long side of the liquid crystal display device. In addition, the vertical direction is parallel to the short side of the liquid crystal display device.

The light sources 120 according to this embodiment may be arranged in a direct type in the lower receiving container 160. That is, a plurality of light sources 120 may be arranged parallel to each other in the same phase.

The light sources 120 are fixed to sockets 165 that are arranged parallel to a vertical side wall 160b of the lower receiving container 160. The sockets 165 are arranged adjacent to the vertical side wall 160b of the lower receiving container 160.

The diffusion plate 130 is provided above the light sources 120, and diffuses light emitted from the light sources 120 to improve brightness uniformity.

The diffusion plate 130 may be formed by mixing a diffusion material with a transparent resin plate in order to obtain uniform brightness. The transparent resin plate may be formed of, for example, acryl or polycarbonate. For example, fine particles of any of the following materials may be used as the diffusion material: crosslinked polymethyl methacrylate; crosslinked polystyrene; crosslinked polyacrylic acid; crosslinked silicon; crosslinked copolymer of acryl and styrene; calcium carbonate; and barium sulfate. However, a material forming the transparent resin plate or the diffusion material is not limited thereto.

The diffusion plate 130 is flat, and may be mounted on the supporting wall 300. In addition, the center of the diffusion plate 130 may be supported by a supporting table (not shown) in order to prevent the center of the diffusion plate from sagging.

The optical sheet 140 is provided above the diffusion plate 130, and diffuses and condenses light passing through the diffusion plate 130.

The optical sheet 140 includes, for example, a diffusion sheet, a first prism sheet, and a second prism sheet. The diffusion sheet is provided at an upper part of the optical sheet 140 and improves the brightness of light emitted from the light sources 120 and brightness uniformity. The first and second prism sheets are provided on the diffusion sheet, and condense light diffused by the diffusion sheet. However, when only the first prism sheet is sufficient to obtain desired brightness and viewing angle, the second prism sheet may be omitted.

The optical sheet 140 is a flat sheet, and may be provided on the supporting walls 300 together with the diffusion plate 130. When the diffusion plate 130 and the optical sheet 140 are provided on the supporting walls 300, a separate mounting protrusion (not shown) for mounting the diffusion plate 130 and the optical sheet 140 may not be formed on the intermediate receiving container 200. In this case, it is possible to reduce the thickness of a liquid crystal display device by a value corresponding to the mounting protrusion.

The reflecting sheet 150 may be provided on a bottom 160c of the lower receiving container 160. The reflecting sheet 150 reflects upward some light components that do not travel toward the liquid crystal panel 113 but leak to the bottom or the side of the lower receiving container 160 among the light components emitted from the light sources 120.

The reflecting sheet 150 may be formed by dispersing a white pigment, such as a titanium oxide, in a synthetic resin sheet. Bubbles for scattering light may be dispersed in the synthetic resin sheet.

As shown in FIG. 3, the reflecting sheet 150 may include, for example, a rectangular bottom 150b and at least one inclined plane 150a that is formed along the long side of the bottom 150b and reflects light leaking from the side of the lower receiving container 160. The inclined planes 150a may be formed to correspond to lower receiving container side walls 160a and 160b.

When the lower receiving container 160 is formed of a reflective material, the reflecting sheet 150 may be omitted, which will be described below. In this case, the number of processes for adhering the reflecting sheet 150 is reduced. Therefore, it is possible to reduce the manufacturing costs of a liquid crystal display device.

The lower receiving container 160 is provided at a lower part of the liquid crystal display device and accommodates the light sources 120, the diffusion plate 130, and the optical sheet 140 therein. The lower receiving container 160 will be described in detail below.

The upper receiving container 170 includes, for example, four upper receiving container side walls 170a and 170b, and a window through which the liquid crystal panel 113 is exposed to the outside is formed in the upper surfaces of the four upper receiving container side walls 170a and 170b. The upper surfaces of the upper receiving container side walls 170a and 170b may be bent downward so as to press and fix the upper edge of the liquid crystal panel 113.

The upper receiving container 170 may be coupled to the intermediate receiving container 200 by fitting engaging protrusions 241 formed on the intermediate receiving container 200 into engaging grooves 175, which will be described below, formed in the upper receiving container side walls 170a and 170b. The upper receiving container 170 may be coupled to the intermediate receiving container 200 by screws. In addition, various methods other than the above may be used to couple the upper receiving container and the intermediate receiving container. In order to firmly assemble the liquid crystal display device, the upper receiving container 170 may be coupled to the lower receiving container 160 by hooks and/or screws.

The intermediate receiving container 200 includes, for example, rectangular frame-shaped intermediate receiving container side walls 210a and 210b and mounting protrusions 220a and 220b that respectively protrude from the intermediate receiving container side walls 210a and 210b to the center. The liquid crystal panel 113 is mounted to the mounting protrusions 220a and 220b.

The intermediate receiving container 200 is formed of a material having rigidity such that it can accommodate the liquid crystal panel 113 therein and be coupled to the lower receiving container 160. The intermediate receiving container 200 may be formed of a non-reflective material and have a black-based color so as to prevent light leakage.

Engaging protrusions 241 are formed on the outer surfaces of the intermediate receiving container side walls 210a and 210b, and are fixedly fitted into the engaging grooves 175 of the upper receiving container 170.

An insertion groove 230b may be formed in the bottom of the intermediate receiving container side wall 210b, which extends in the vertical direction, of the intermediate receiving container side walls 210a and 210b. The lower receiving container side wall 160b is inserted into the insertion groove 230b to couple the intermediate receiving container 200 to the lower receiving container 160.

Next, the lower receiving container 160, the supporting walls 300, and the reflecting cover 400 according to this embodiment will be described in detail with reference to FIGS. 2 to 4.

The lower receiving container 160 includes, for example, the rectangular bottom 160c and the lower receiving container side walls 160a and 160b formed along the edge of the bottom 160c. The lower receiving container 160 according to this embodiment may be formed of a reflective resin. The lower receiving container 160 may have a white-based color so as to improve reflectance. The lower receiving container 160 having the above-mentioned characteristics may be formed of, for example, polycarbonate (PC) or a material obtained by adding a glass fiber to polycarbonate.

The lower receiving container side walls 160a and 160b may extend from the bottom 160c of the lower receiving container 160 in the vertical direction. That is, a lower receiving container inclined plane 160d having an obtuse angle with respect to the bottom 160c of the lower receiving container 160 may be formed on the side wall 160a that is arranged along the long side of the lower receiving container 160. The lower receiving container inclined plane 160d extends in the same direction as the light source 120 extends and reflects light emitted from the light sources 120 to the side wall of the lower receiving container 160 to the liquid crystal panel 113. In this case, no reflecting member may be provided between the light sources 120 and the bottom 160c and the lower receiving container inclined planes 160d of the lower receiving container 160. That is, the reflecting sheet 150 may be omitted.

The supporting walls 300 may be formed in the lower receiving container 160. The supporting walls 300 may be formed together with the lower receiving container 160 by, for example, injection molding. Since the lower receiving container 160 is made of a resin material, it is easy to form the lower receiving container 160 integrally with the supporting walls 300.

A plurality of supporting walls 300 may be arranged in a line along the lower receiving container side wall 160b that is formed in the vertical direction. The supporting walls 300 may be arranged parallel to a pair of the lower receiving container side walls 160b that are formed in the vertical direction. The supporting walls 300 according to this embodiment may be made of the same reflective resin as that forming the lower receiving container 160. In this case, the brightness of a liquid crystal display device can be improved.

The supporting walls 300 may be spaced from the lower receiving container side wall 160b formed in the vertical direction. The sockets 165 are arranged in a space 165s between the supporting walls 300 and the lower receiving container side wall 160b that is formed in the vertical direction. Socket insertion holes (not shown) into which the sockets 165 are inserted may be formed in the bottom 160c of the lower receiving container 160. The end of each of the light sources 120 has low brightness, and a dark portion may be formed at the end of the light source. The ends of the light sources 120 are arranged between the supporting walls 300 and the lower receiving container side wall 160b that is formed in the vertical direction. Therefore, it is possible to prevent the dark portion from being seen by the viewer.

In addition, the plurality of supporting walls 300 may be arranged with a gap P therebetween. The light sources 120 are provided in the gaps P between the plurality of supporting walls 300.

Each of the supporting walls 300 includes a supporting wall upper surface 310 and a supporting wall inclined plane 320 that extends from the supporting wall upper surface 310 to the bottom 160c of the lower receiving container 160 and has a first length L1. Light emitted from the light sources 120 is reflected from the supporting wall inclined plane 320 to the liquid crystal panel 113. However, the intermediate receiving container 200 having a black-based color or the reflecting cover 400 that covers the gaps P between the supporting walls 300 to prevent dark portions from being formed at the ends of the light sources 120 is provided on the supporting walls.

The reflecting cover 400 according to this embodiment is a reflective sheet. Specifically, the reflecting cover 400 may be made of the same material as that forming the reflecting sheet 150. Therefore, it is possible to significantly reduce manufacturing costs, as compared to the structure in which a separate side mold (not shown) is provided in the lower receiving container 160 to prevent a dark portion from being viewed. In addition, it is very easy to manufacture the sheet-shaped reflecting cover 400 and adhere the reflecting cover to the liquid crystal display device. Therefore, it is possible to simplify a manufacturing process.

The reflecting cover 400 according to this embodiment extends in the direction in which the supporting walls 300 extend to connect the plurality of supporting walls 300. Therefore, the gaps P between the supporting walls 300 are covered by the reflecting cover 400. However, the reflecting cover does not need to cover all the gaps P, but it may cover only the upper parts of the gaps as long as dark portions are prevented from being viewed. Specifically, the reflecting cover 400 includes a reflecting cover upper surface 410 that covers the supporting wall upper surfaces 310 and a reflecting cover inclined plane 420 that extends from the reflecting cover upper surface 410 and has a second length L2 smaller than the first length L1. The second length L2 may vary depending on the inclination angle of the supporting wall 300 as long as dark portions are prevented from being viewed. As described above, since the reflecting cover 400 covers the gaps P between the supporting walls 300, dark portions caused by the gaps P are removed, and it is possible to prevent dark portions from being viewed from a liquid crystal display device. As a result, it is possible to improve brightness.

The reflecting cover upper surface 410 may be pressed and fixed by the diffusion plate 130 and the optical sheet 140 provided on the supporting wall upper surfaces 310. In addition, the reflecting cover upper surface 410 may be adhered to the supporting wall upper surfaces 310 by an adhesive member.

Figure 5:
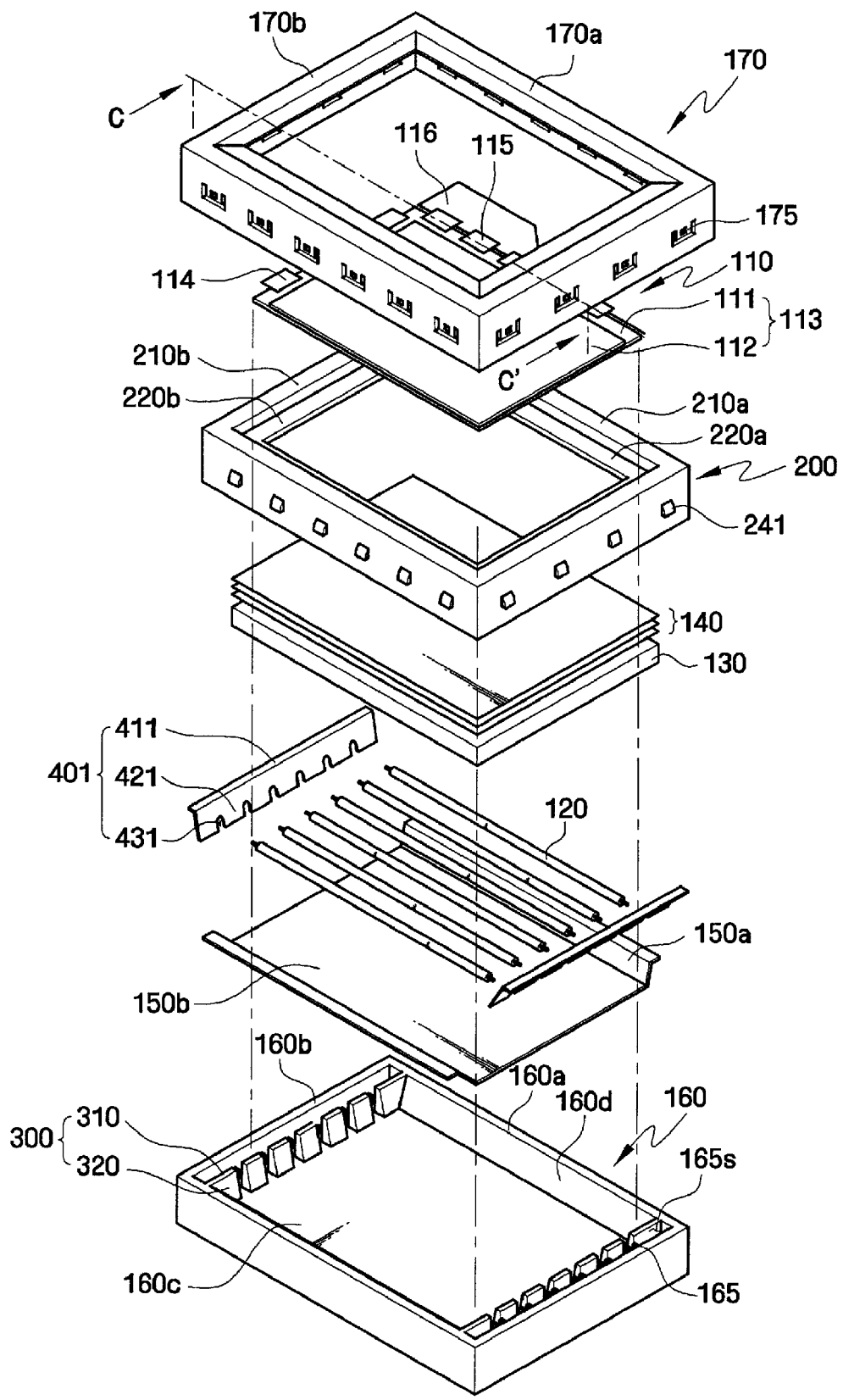
FIG. 5 is an exploded perspective view illustrating a liquid crystal display device according to a second embodiment of the present invention.
Figure 6:
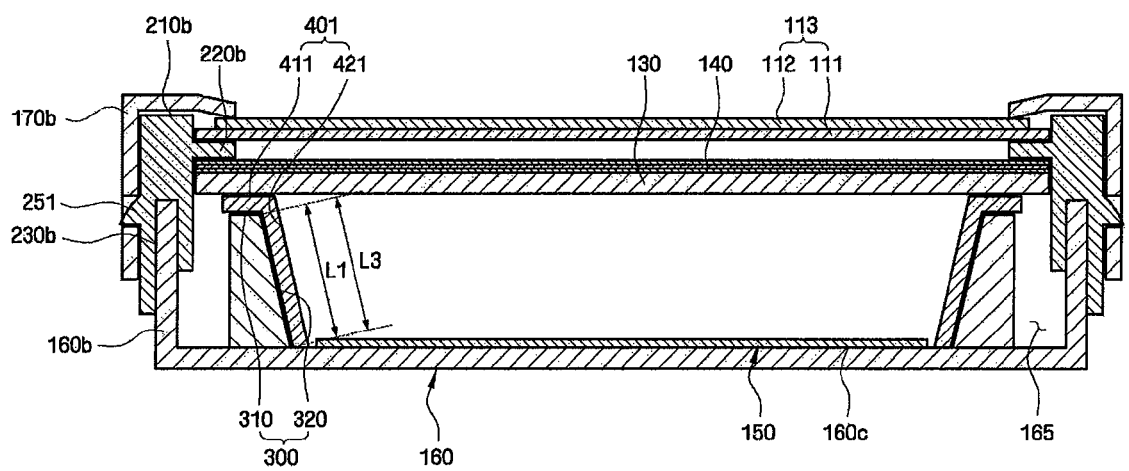
FIG. 6 is a cross-sectional view illustrating the liquid crystal display device taken along the line C-C' of FIG. 5.
Figure 7:
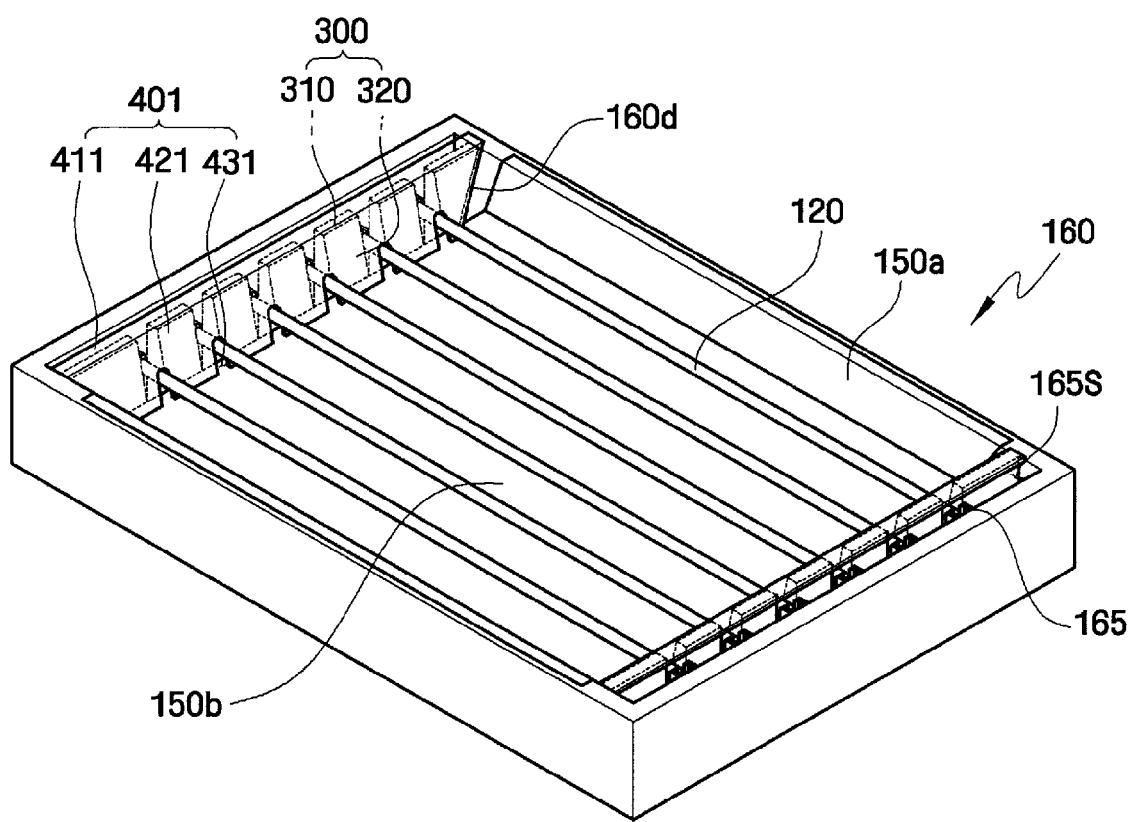
FIG. 7 is a perspective view illustrating a lower receiving container of the liquid crystal display device according to the second embodiment of the present invention.

Next, a liquid crystal display device according to a second embodiment of the present invention will be described in detail with reference to FIGS. 5 to 7. FIG. 5 is an exploded perspective view illustrating the liquid crystal display device according to the second embodiment of the present invention. FIG. 6 is a cross-sectional view illustrating the liquid crystal display device taken along the line C-C' of FIG. 5. FIG. 7 is a perspective view illustrating a lower receiving container of the liquid crystal display device according to the second embodiment of the present invention. For clarity of description, in the second embodiment, components having the same functions as those in the first embodiment are denoted by the same reference numerals. Thus, a description thereof will be omitted, or the same components will be briefly described.

A reflecting cover 401 according to this embodiment includes a reflecting cover upper surface 411 that covers the supporting wall upper surfaces 310, a reflecting cover inclined plane 421 that extends from the reflecting cover upper surface 411 and has a third length L3 that is substantially equal to the first length L1 of the supporting wall inclined plane 320, and light source insertion holes 431 that are formed at positions corresponding to the light sources 120.

The reflecting cover 401 according to this embodiment covers all the supporting wall inclined planes 320 to more effectively prevent dark portions from being viewed.

Since the reflecting cover 401 includes the light source insertion holes 431, it is possible to easily arrange the reflecting cover 401 after the light sources 120 are assembled.

Figure 8:
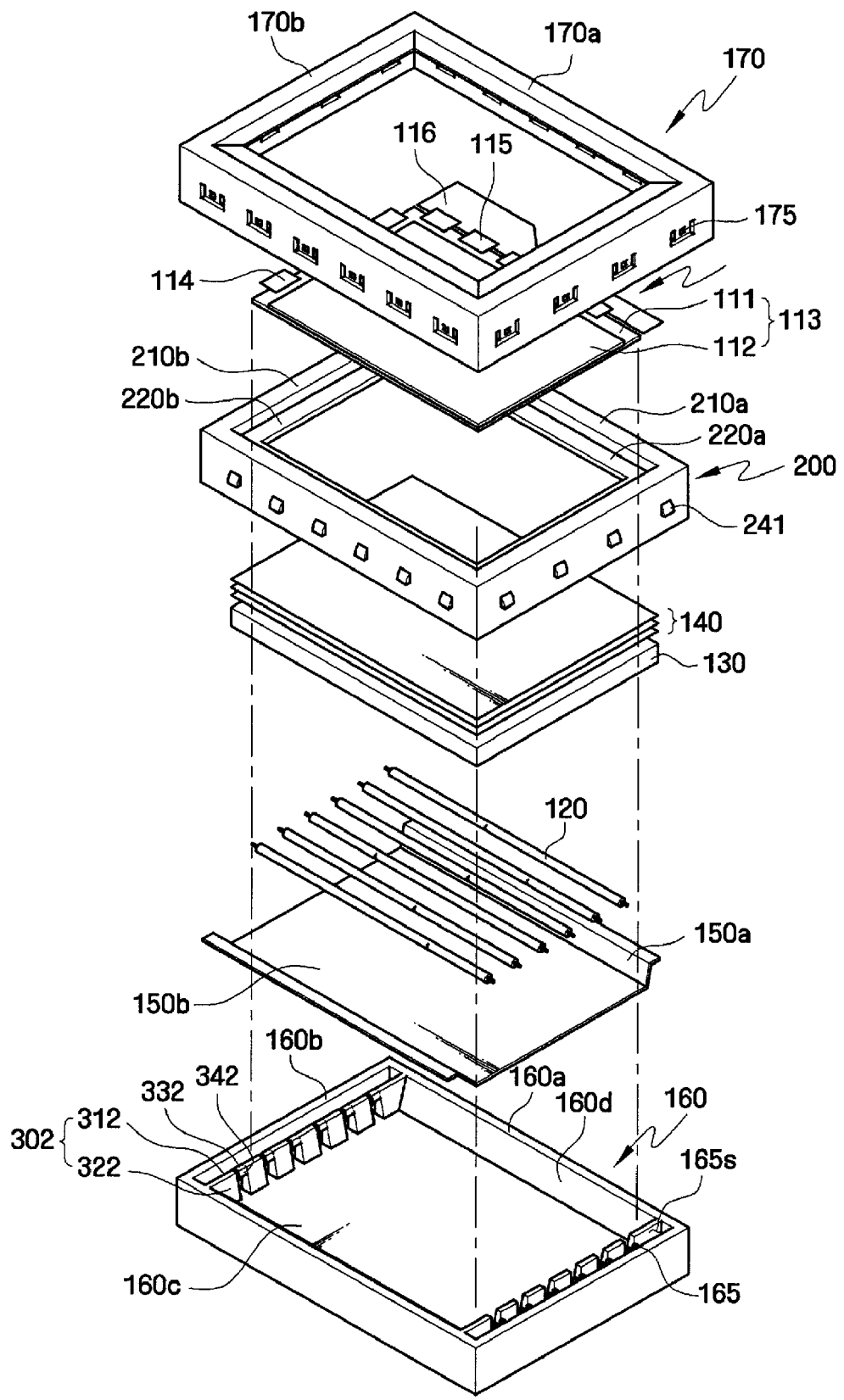
FIG. 8 is an exploded perspective view illustrating a liquid crystal display device according to a third embodiment of the present invention.
Figure 9:
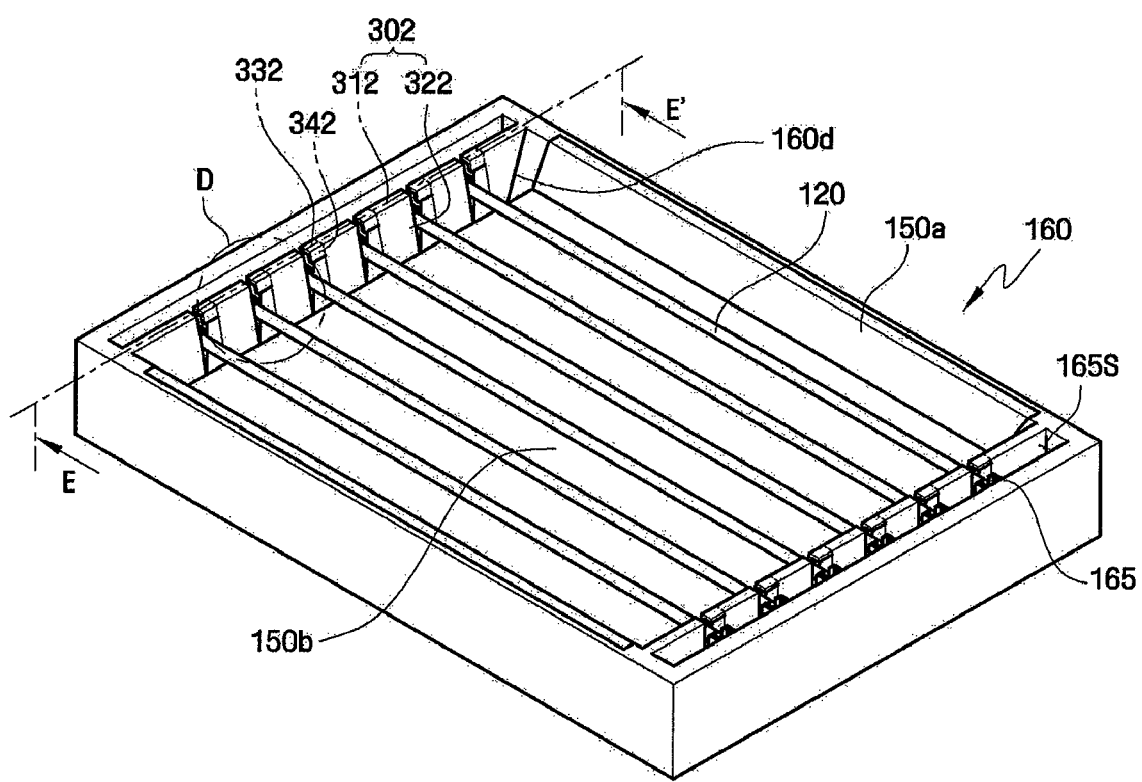
FIG. 9 is a perspective view illustrating a lower receiving container of the liquid crystal display device according to the third embodiment of the present invention.
Figure 10:
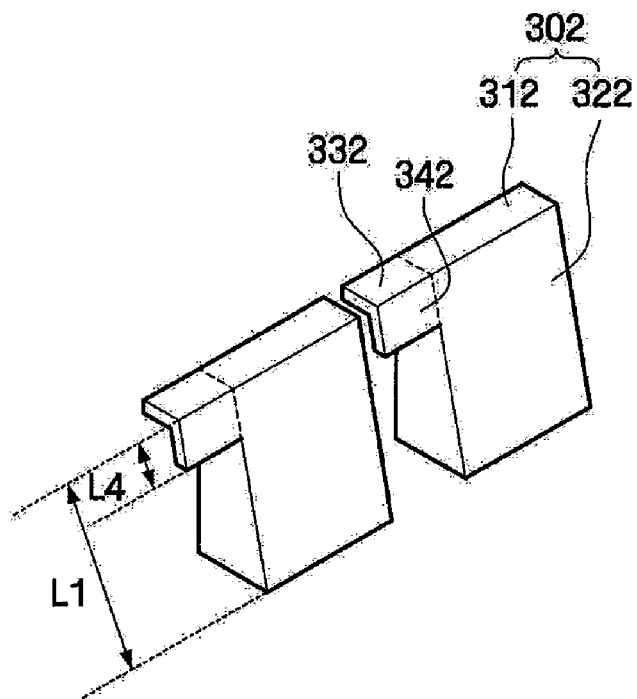
FIG. 10 is an enlarged view illustrating a portion D of FIG. 9.
Figure 11:
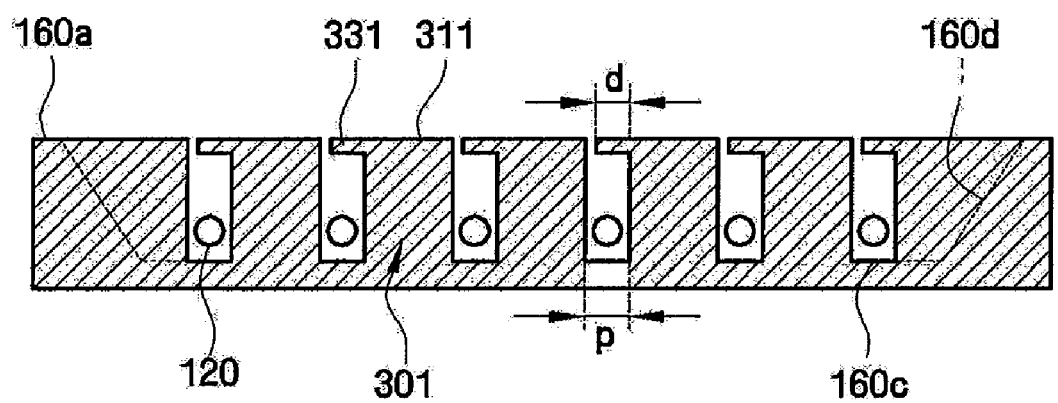
FIG. 11 is a cross-sectional view illustrating the liquid crystal display device taken along the line E-E' of FIG. 9.

Next, a liquid crystal display device according to a third embodiment of the present invention will be described in detail with reference to FIGS. 8 to 11. FIG. 8 is an exploded perspective view illustrating the liquid crystal display device according to the third embodiment of the present invention. FIG. 9 is a perspective view illustrating a lower receiving container of the liquid crystal display device according to the third embodiment of the present invention. FIG. 10 is an enlarged view illustrating a portion D of FIG. 9. FIG. 11 is a cross-sectional view illustrating the liquid crystal display device taken along the line E-E' of FIG. 9.

Reflecting covers 332 and 342 extend from one side surface of one supporting wall 302 to another supporting wall 302 among a plurality of supporting walls 302.

The reflecting covers 332 and 342 may be made of the same reflective material as that forming the supporting walls 302. In this case, the lower receiving container 160, the supporting walls 302, and the reflecting covers 332 and 342 may be integrally formed of the same material.

The reflecting covers 332 and 342 may have elasticity such that the light sources 120 can be inserted in the vertical direction of the bottom 160c of the lower receiving container 160. In order to insert the light sources in the vertical direction, the reflecting covers 332 and 342 may be thin sheets. Specifically, the reflecting covers 332 and 342 may extend as thin sheets from the supporting wall upper surface 312 and the supporting wall inclined plane 322 and form a reflecting cover upper surface 332 and a reflecting cover inclined plane 342.

The gap P between adjacent supporting walls 302 is covered with the reflecting covers 332 and 342 that extend from the side surface of the supporting wall 302. Similar to the first embodiment, the reflecting covers 332 and 342 do not need to cover the entire gap P in the length direction, but the reflecting cover inclined plane 342 may have such a length that a dark portion is not viewed. In this case, the length L4 of the reflecting cover inclined plane 342 may be equal to the length L2 according to the first embodiment of the present invention. However, the width of each of the reflecting covers 332 and 342 may be equal to the gap P between the supporting walls 302 such that the entire gap P can be covered in the width direction.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display device comprising:
   a lower receiving container;
   a plurality of supporting walls arranged in a line along at least one side wall of the lower receiving container with gaps therebetween;
   a plurality of light sources arranged in a line so as to be provided in the gaps;
   a reflecting sheet positioned on the lower receiving container and under the light sources; and
   a reflecting cover covering at least a portion of each of the gaps, the reflecting cover having a body made of the same material as that of the reflecting sheet.

2. The liquid crystal display device of claim 1, wherein:
   each of the supporting walls includes:
   a supporting wall upper surface; and
   a supporting wall inclined plane that extends from the supporting wall upper surface to the bottom of the lower receiving container and has a first length.

3. The liquid crystal display device of claim 2, wherein the reflecting cover is provided on the plurality of supporting walls, and extends in a direction in which the plurality of supporting walls are arranged so as to cover all the supporting walls and all the gaps.

4. The liquid crystal display device of claim 3, wherein the reflecting cover comprises a reflective material.

5. The liquid crystal display device of claim 4, wherein:
   the reflecting cover includes:
   a reflecting cover upper surface that covers the supporting wall upper surfaces; and
   a reflecting cover inclined plane that extends from the reflecting cover upper surface and has a second length smaller than the first length.

6. The liquid crystal display device of claim 4, wherein:
   the reflecting cover includes:
   a reflecting cover upper surface that covers the supporting wall upper surfaces;
   a reflecting cover inclined plane that extends from the reflecting cover upper surface and has a third length substantially equal to the first length; and
   light source insertion holes that are formed at positions corresponding to the light sources.

7. The liquid crystal display device of claim 2, wherein the reflecting cover extends from one side surface of one supporting wall to another supporting wall among the plurality of supporting walls.

8. The liquid crystal display device of claim 7, wherein the reflecting cover is made of the same material as that forming the supporting walls and has elasticity.

9. The liquid crystal display device of claim 7, wherein the width of the reflecting cover is substantially equal to the gap between the supporting walls.

10. The liquid crystal display device of claim 2, further comprising:
    an optical sheet mounted on the supporting wall upper surface.

11. The liquid crystal display device of claim 1, further comprising:
    an intermediate receiving container that is provided above the lower receiving container and is made of a non-reflective resin,
    wherein the supporting walls and the lower receiving container are made of a light reflective resin.

12. The liquid crystal display device of claim 11, wherein the intermediate receiving container has a black-based color.

13. The liquid crystal display device of claim 11, wherein the supporting walls and the lower receiving container are integrally formed.

14. The liquid crystal display device of claim 11, wherein:
    another side wall of the lower receiving container that is vertical to one side wall includes a reflective lower receiving container inclined plane, and
    no reflecting member is provided between the light sources and the bottom and the lower receiving container inclined plane of the lower receiving container.

15. The liquid crystal display device of claim 1, wherein:
    a space is formed between the plurality of supporting walls and the side wall of the lower receiving container, and
    the ends of the plurality of light sources are arranged in the space.

16. A liquid crystal display device comprising:
    a lower receiving container;
    a plurality of supporting walls arranged in a line along at least one side wall of the lower receiving container with gaps therebetween;
    a plurality of light sources arranged in a line so as to be provided in the gaps;
    a reflecting sheet positioned on the lower receiving container and under the light sources;
    a reflecting cover covering at least a portion of each of the gaps, the reflecting cover having a body made of the same material as that of the reflecting sheet; and
    an intermediate receiving container provided above the lower receiving container and made of a non-reflective resin,
    wherein each of the supporting walls includes:
    a supporting wall upper surface; and
    a supporting wall inclined plane that extends from the supporting wall upper surface to the bottom of the lower receiving container and has a first length.

17. The liquid crystal display device of claim 16, wherein the reflecting cover comprises a reflective material.

18. The liquid crystal display device of claim 17, wherein:
    the reflecting cover includes:
    a reflecting cover upper surface that covers the supporting wall upper surfaces; and
    a reflecting cover inclined plane that extends from the reflecting cover upper surface and has a second length smaller than the first length.

19. The liquid crystal display device of claim 16, wherein:
    another side wall of the lower receiving container that is vertical to one side wall includes a reflective lower receiving container inclined plane, and no reflecting member is provided between the light sources and the bottom and the lower receiving container inclined plane of the lower receiving container.

20. The liquid crystal display device of claim 16, wherein:

a space is formed between the plurality of supporting walls and the side wall of the lower receiving container, and the ends of the plurality of light sources are arranged in the space.

* * * * *